(12) United States Patent
Yoon et al.

(10) Patent No.: US 12,556,688 B2
(45) Date of Patent: Feb. 17, 2026

(54) MERGE AND BLOCK VECTOR REFINEMENT FOR INTRA TEMPLATE MATCHING PREDICTION

(71) Applicant: Tencent America LLC, Palo Alto, CA (US)

(72) Inventors: Yonguk Yoon, Palo Alto, CA (US); Biao Wang, San Jose, CA (US); Roman Chernyak, Santa Clara, CA (US); Lien-Fei Chen, Palo Alto, CA (US); Motong Xu, Palo Alto, CA (US); Ziyue Xiang, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 18/923,653

(22) Filed: Oct. 22, 2024

(65) Prior Publication Data

US 2025/0193372 A1    Jun. 12, 2025

Related U.S. Application Data

(60) Provisional application No. 63/608,905, filed on Dec. 12, 2023.

(51) Int. Cl.
*H04N 19/105* (2014.01)
*H04N 19/176* (2014.01)

(52) U.S. Cl.
CPC ......... *H04N 19/105* (2014.11); *H04N 19/176* (2014.11)

(58) Field of Classification Search
None
See application file for complete search history.

(56) References Cited

U.S. PATENT DOCUMENTS

2023/0075788 A1* 3/2023 Li .................. H04N 19/105

* cited by examiner

*Primary Examiner* — Lindsay J Uhl
(74) *Attorney, Agent, or Firm* — ARENTFOX SCHIFF LLP

(57) ABSTRACT

A bitstream including coded information of a current block and neighboring blocks of the current block in a current picture is received. Whether a merge mode is enabled for the current block is determined based on whether one or more of the neighboring blocks are coded by an intra template matching mode. When the merge mode is enabled for the current block, a merge candidate list that includes the one or more of the neighboring blocks of the current block is generated. A reference block vector is determined based on template matching information of a merge candidate selected from the merge candidate list. The reference block vector is refined to obtain a refined reference block vector for the current block. The current block is reconstructed based on a reference block indicated by the refined reference block vector.

20 Claims, 9 Drawing Sheets

MERGE AND BLOCK VECTOR REFINEMENT FOR INTRA TEMPLATE MATCHING PREDICTION

INCORPORATION BY REFERENCE

The present application claims the benefit of priority to U.S. Provisional Application No. 63/608,905, "MERGE AND BLOCK VECTOR REFINEMENT FOR INTRA TEMPLATE MATCHING PREDICTION" filed on Dec. 12, 2023, which is incorporated by reference herein in its entirety.

TECHNICAL FIELD

The present disclosure describes aspects generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include bitstreams, methods, and apparatuses for video encoding/decoding. In some examples, an apparatus for video encoding/decoding includes processing circuitry.

According to an aspect of the disclosure, a method of video decoding is provided. In the method, a bitstream including coded information of a current block and neighboring blocks of the current block in a current picture is received. Whether a merge mode is enabled for the current block is determined based on whether one or more of the neighboring blocks are coded by an intra template matching mode. When the merge mode is enabled for the current block, a merge candidate list that includes the one or more of the neighboring blocks of the current block is generated. A reference block vector is determined based on template matching information of a merge candidate selected from the merge candidate list. The reference block vector is refined to obtain a refined reference block vector for the current block. The current block is reconstructed based on a reference block indicated by the refined reference block vector.

According to an aspect of the disclosure, a method of video encoding is provided. In the method, whether a merge mode is enabled for a current block in a current picture is determined based on whether one or more of neighboring blocks of the current block are coded by an intra template matching mode. When the merge mode is enabled for the current block, a merge candidate list is generated to include the one or more of the neighboring blocks of the current block. A reference block vector is obtained based on a merge candidate selected from the merge candidate list. The reference block vector is refined to obtain a refined reference block vector for the current block. The current block is encoded in a bitstream based on a reference block indicated by the refined reference block vector.

According to yet another aspect of the disclosure, a method of processing visual media data is provided. In the method, a bitstream of the visual media data is processed according to a format rule. In an example, the bitstream includes coded information of a current block and neighboring blocks of the current block in a current picture. The format rule specifies that whether a merge mode is enabled for the current block is determined based on whether one or more of the neighboring blocks are coded by an intra template matching mode. The format rule specifies that, when the merge mode is enabled for the current block, a merge candidate list that includes the one or more of the neighboring blocks of the current block is generated. The format rule specifies that a reference block vector is obtained based on template matching information of a merge candidate selected from the merge candidate list. The format rule specifies that the reference block vector is refined to obtain a refined reference block vector for the current block. The format rule specifies that the current block is processed based on a reference block indicated by the refined reference block vector.

Aspects of the disclosure also provide an apparatus for video decoding. The apparatus for video decoding includes processing circuitry configured to implement any of the described methods for video decoding.

Aspects of the disclosure also provide an apparatus for video encoding. The apparatus for video encoding includes processing circuitry configured to implement any of the described methods for video encoding.

Aspects of the disclosure also provide a non-transitory computer-readable medium storing instructions which, when executed by a computer, cause the computer to perform any of the described methods for video decoding/encoding.

Technical solutions of the disclosure include methods and apparatuses for improving coding accuracy and efficiency based on refinement of a reference block vector of a current block. In an example, a bitstream including coded information of a current block and neighboring blocks of the current block in a current picture is received. Whether a merge mode is enabled for the current block is determined based on whether one or more of the neighboring blocks are coded by an intra template matching mode. When the merge mode is enabled for the current block, a merge candidate list that includes the one or more of the neighboring blocks of the current block is generated. A reference block vector is determined based on template matching information of a merge candidate selected from the merge candidate list. The reference block vector is refined to obtain a refined reference block vector for the current block. The current block is reconstructed based on a reference block indicated by the refined reference block vector. By refining a reference block vector of the current block based on template matching information of a merge candidate, coding efficiency and accuracy are improved.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
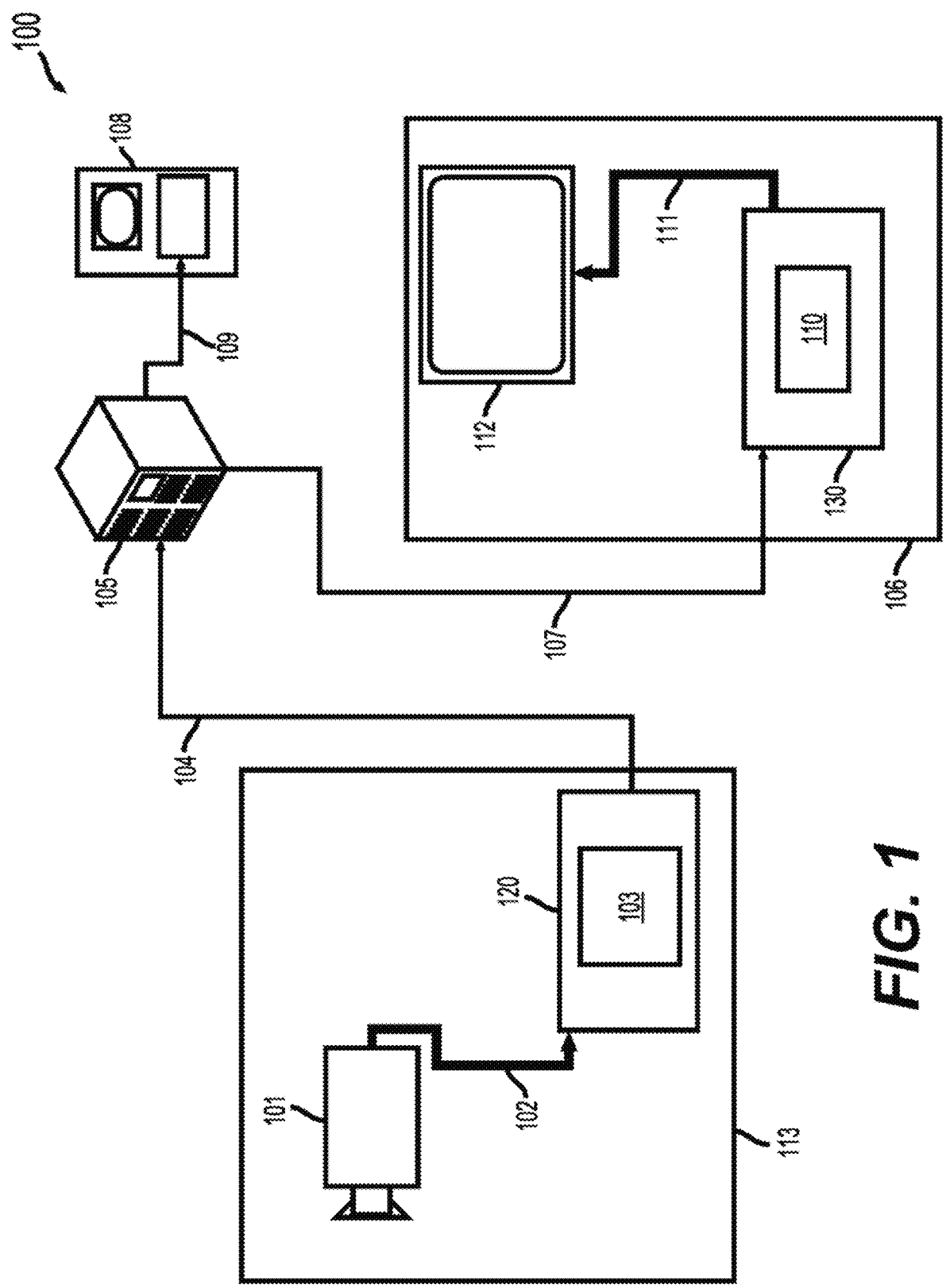
FIG. 1 is a schematic illustration of an example of a block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
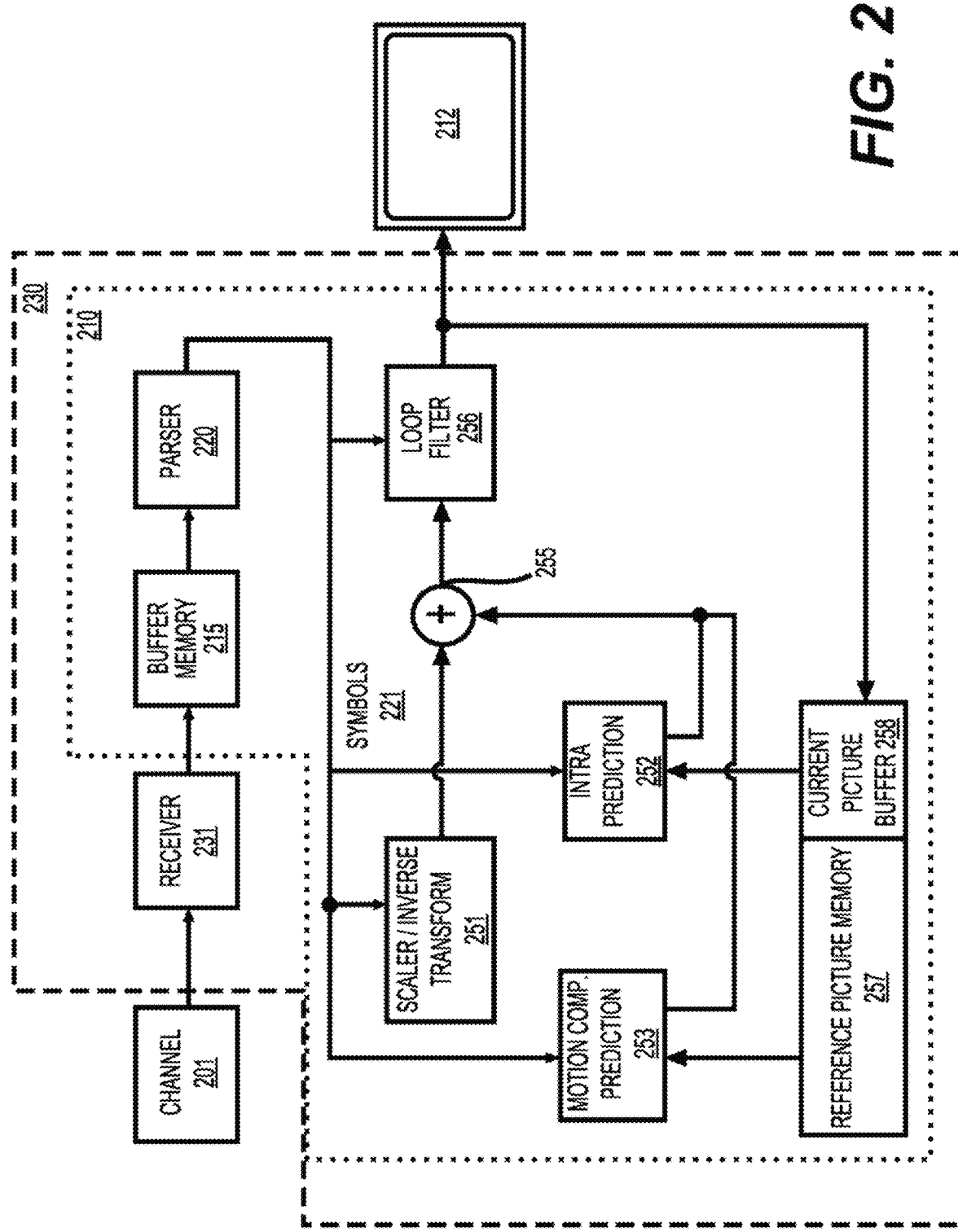
FIG. 2 is a schematic illustration of an example of a block diagram of a decoder.

FIG. 2 shows an example of a block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an aspect, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an aspect, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
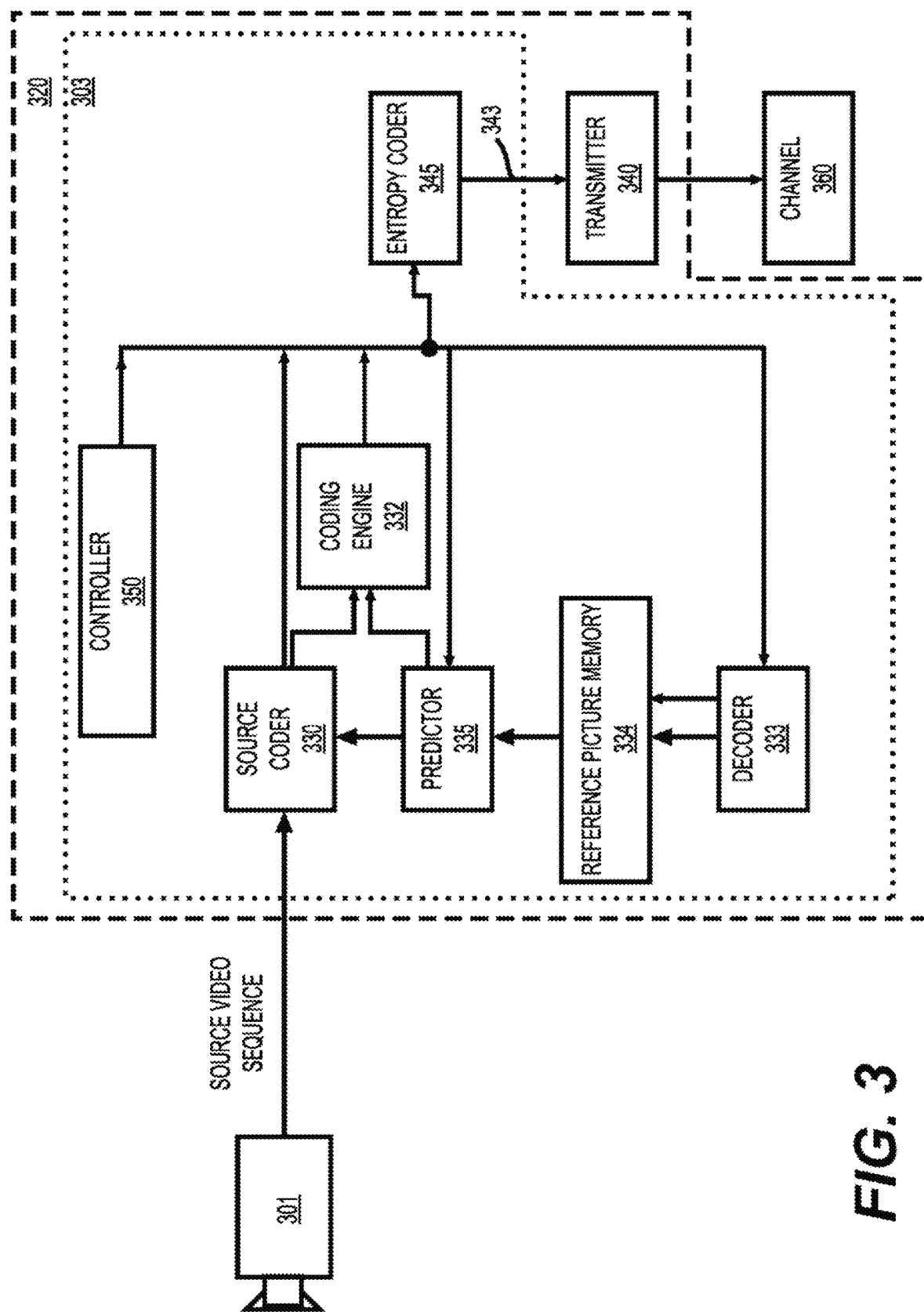
FIG. 3 is a schematic illustration of an example of a block diagram of an encoder.

FIG. 3 shows an example of a block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an aspect, the video encoder (303) may code and compress the pictures of the source video sequence into a coded video sequence (343) in real time or under any other time constraints as required. Enforcing appropriate coding speed is one function of a controller (350). In some aspects, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some aspects, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an aspect, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an aspect, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some aspects, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some aspects of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an aspect, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an aspect, the video encoders (103) and (303) and the video decoders (110) and (210) can be implemented using one or more integrated circuits. In another aspect, the video encoders (103) and (303), and the video decoders (110) and (210) can be implemented using one or more processors that execute software instructions.

Aspects of the disclosure includes methods and systems directed to a block vector refinement for template matching prediction.

Video coding has been widely used in many applications. Various video coding, such as H264, H265, H266 (VVC), AV1, and AVS, have been widely adopted. A video codec generally includes several modules, such as intra/inter prediction, transform coding, quantization, entropy coding, and in loop filtering. The current disclosure provides a set of methods for video compression that includes template matching prediction.

For an intra prediction, to find a matched prediction for a current block, several template matching-based predictions are introduced. Using a template which is a reconstructed sample group around the current block, a best matched block is copied as a prediction of the current block. An encoder transmits usage of the template matching-based prediction. The template matching-based prediction includes mode flags and vector indices which indicate a selected one of template matching candidates. Meanwhile, for an inter prediction, in order to reduce signaling overhead in motion vector signaling, several merge approaches using neighboring coded information have been proposed. To find a more precise prediction block from merge candidates, a motion vector adjustment (or refinement) is performed from a block corresponding to a neighboring motion vector. A motion vector difference between the neighboring motion vector and the refined motion vector is signaled with a direction index and a distance index.

Figure 4:
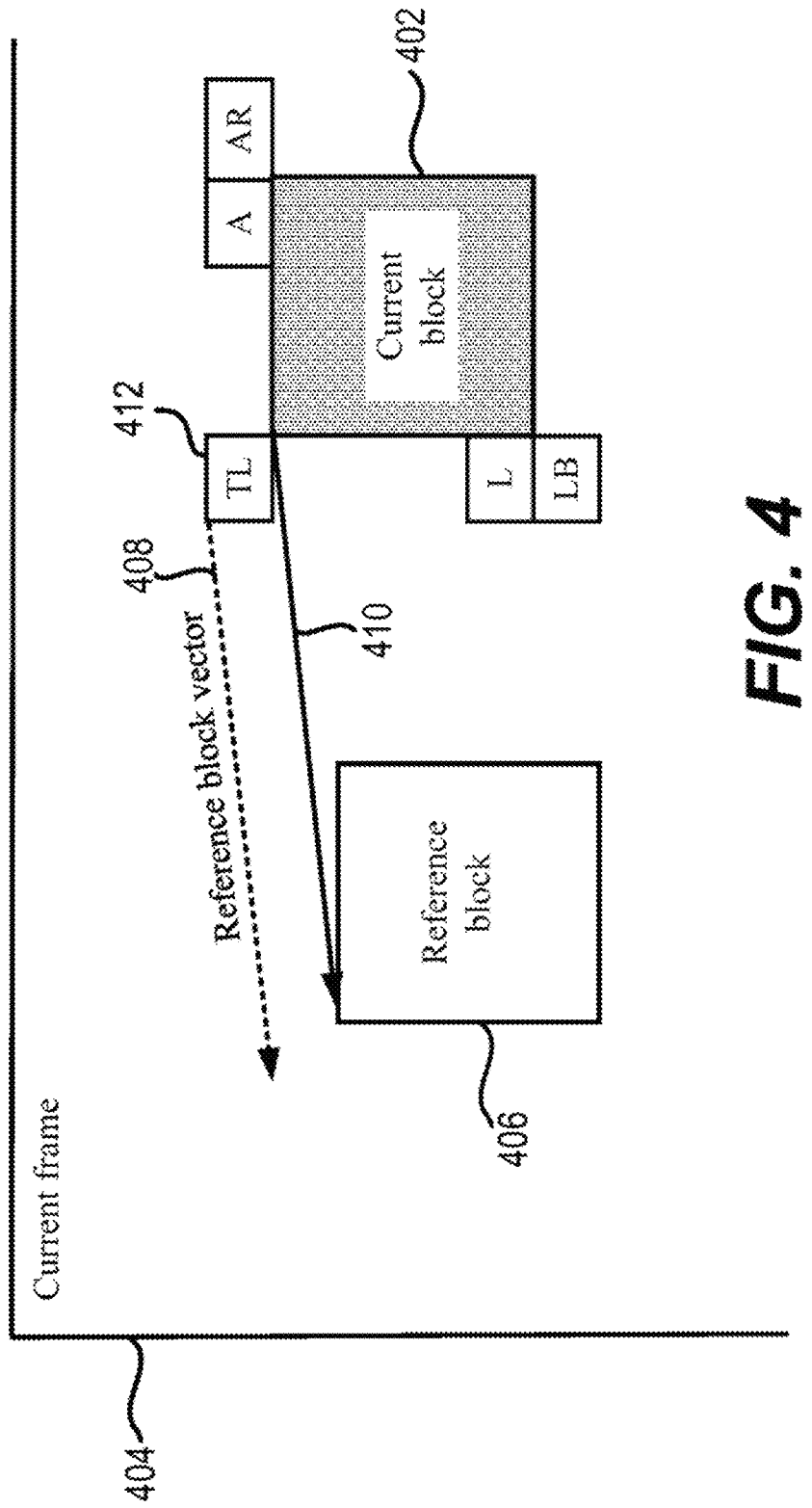
FIG. 4 is a schematic illustration of an example of a reference block vector and a reference block according to some aspects of the disclosure.

In an aspect, a reference block vector indicates a block vector derived from neighboring coded information. In an aspect, a reference block indicates a block corresponding to the reference block vector from a current block to the reference block. An example of a reference block vector and the corresponding reference block is shown in FIG. 4. In an aspect, template matching information includes template matching prediction method flags, a block vector index which indicates one of template matching candidates, a filtering flag, and/or a sub-pel flag and an index. The sub-pel flag indicates whether a sub-pel refinement is applied and the index indicates which sub-pel candidate is used.

As shown in FIG. 4, a current block (402) is included in a current frame (404). The current block (402) includes a plurality of neighboring samples or blocks: TL (or top left), A (or top/above), AR (or top/above right), L (or left), LB (or left bottom). A reference block vector (408) may be derived based on neighboring information of the current block (402), such as based on the neighboring block TL (412). The reference block vector (408) indicates a reference block (not shown) of the neighboring block TL. Based on the reference block of the neighboring block TL (412), a plurality of candidate reference blocks is determined for the current block (402). The plurality of candidate reference blocks for the current block (402) may be defined around the reference block indicated by the reference block vector (408). A cost value is determined between each candidate reference block and the current block (402). A reference block (406) is selected from the candidate reference blocks as a prediction block for the current block (402) that corresponds to a minimum cost value. The selected reference block (406) is indicated by a refined reference block vector (410) with respect to the reference block vector (408).

In the disclosure, a merge scheme (or merge mode) for an intra template matching prediction is introduced. Firstly, a candidate list is constructed from neighboring coded blocks of a current block. For example, the candidate list may include the neighboring coded blocks (e.g., neighboring block TL (412)) as candidates in the candidate list. Template matching information from one of the candidates in the candidate list is used as template matching information of the current block. Further, a reference block vector is derived from neighboring information of the current block. For example, the reference block vector (408) is derived from the neighboring block TL (412) in FIG. 4. To find a more precise block vector from the reference block vector, the reference block vector is further adjusted (or refined) from a reference block corresponding to the reference block vector. For example, a plurality of candidate reference blocks for the current block may be defined around the reference block that is indicated by the reference block vector. A cost value is determined between each candidate reference block and the current block. A reference block is selected from the candidate reference blocks as a prediction block for the current block that corresponds to a minimum cost value. The selected reference block is indicated by a refined reference block vector. Refined block vector information is further signaled.

In an aspect, if a neighboring block, such as a neighboring intra template matching coded block, exists for a current block, a merge candidate list is constructed to include N candidates. One of the merge candidates in the merge candidate list is used as a current template matching intra prediction for the current block.

In an example, N candidates are derived from neighboring reconstructed samples and/or blocks. Each candidate may indicate a respective reference block that corresponds to a respective neighboring reconstructed block. In an example, N candidates are derived from pre-defined positions (or neighboring blocks in the pre-defined positions). The pre-defined positions may be shown in FIG. 4. As shown in FIG. 4, the pre-defined positions include TL (or top left), A (or top/above), AR (or top/above right), L (or left), LB (or left bottom). Each pre-defined position may include a respective neighboring reconstructed block.

In an example, a pre-defined search order is provided to select a candidate from the candidates derived from the neighboring blocks in the pre-defined positions. An example of the search order includes L→A→AR→LB→TL. It should be noted that, in an example, not every neighboring block in the pre-defined positions L, A, AR, LB, and TL is an intra template matching coded block.

In an example, the search order is determined by at least one of a block size, a block shape, and other coded information of the current block.

In an aspect, how to fill a candidate list is dependent on availability of neighboring blocks, such as neighboring intra template matching blocks. In an example, if no neighboring intra template matching block exists, the candidate list is filled with default template matching information. For example, a pre-defined default candidate list is given. In an example, when more than one neighboring block are coded with intra template matching, an inherence priority of neighboring blocks is pre-defined. For example, a priority order is defined as L→A→AR→LB→TL.

In an aspect, all or partial template matching information is used for a current template matching prediction of a current block. In an example, all template matching information, which includes a template matching prediction method flag, a fusion flag, a block vector index, a filtering flag, a sub-pel flag, and a sub-pel index, is used as the current template matching prediction. In an example, partial template matching information, which includes the template matching prediction method flag and the block vector index is used as the current template matching prediction.

In an aspect, if a merge candidate is used for a current block, a flag and an index, which indicate whether the merge mode is used and which candidate is selected respectively, are signaled. In an encoder side, the merge candidate may be selected as a best-performed one in the candidate list. For example, the selected merge candidate has a minimum prediction residue comparing to other merge candidates.

In an aspect, a reference block vector that is derived based on one of the neighboring blocks of a current block is further refined to generate a refined reference block vector. The current block may further be predicted by a prediction block indicated by the refined reference block vector. In addition of neighboring template information, additional information is signaled. Refinement of the reference block vector may be performed based on cost values between candidate reference blocks indicated by candidate refined reference block vectors and the current block. The candidate refined reference block vectors may be defined around the refence block vector. An example of the candidate refined reference block vectors is shown in FIG. 5 or FIG. 6.

In an example, refined information may be represented with candidates in a one-dimensional refine region. The one-dimensional refine region may be described according to a direction and a distance as shown in FIG. 5. In an example of FIG. 5, a finest refined reference block vector is in an accuracy of quarter pel. Information of the direction and the distance is signaled. A unit of the distance may be an integer and/or a fraction.

Figure 5:
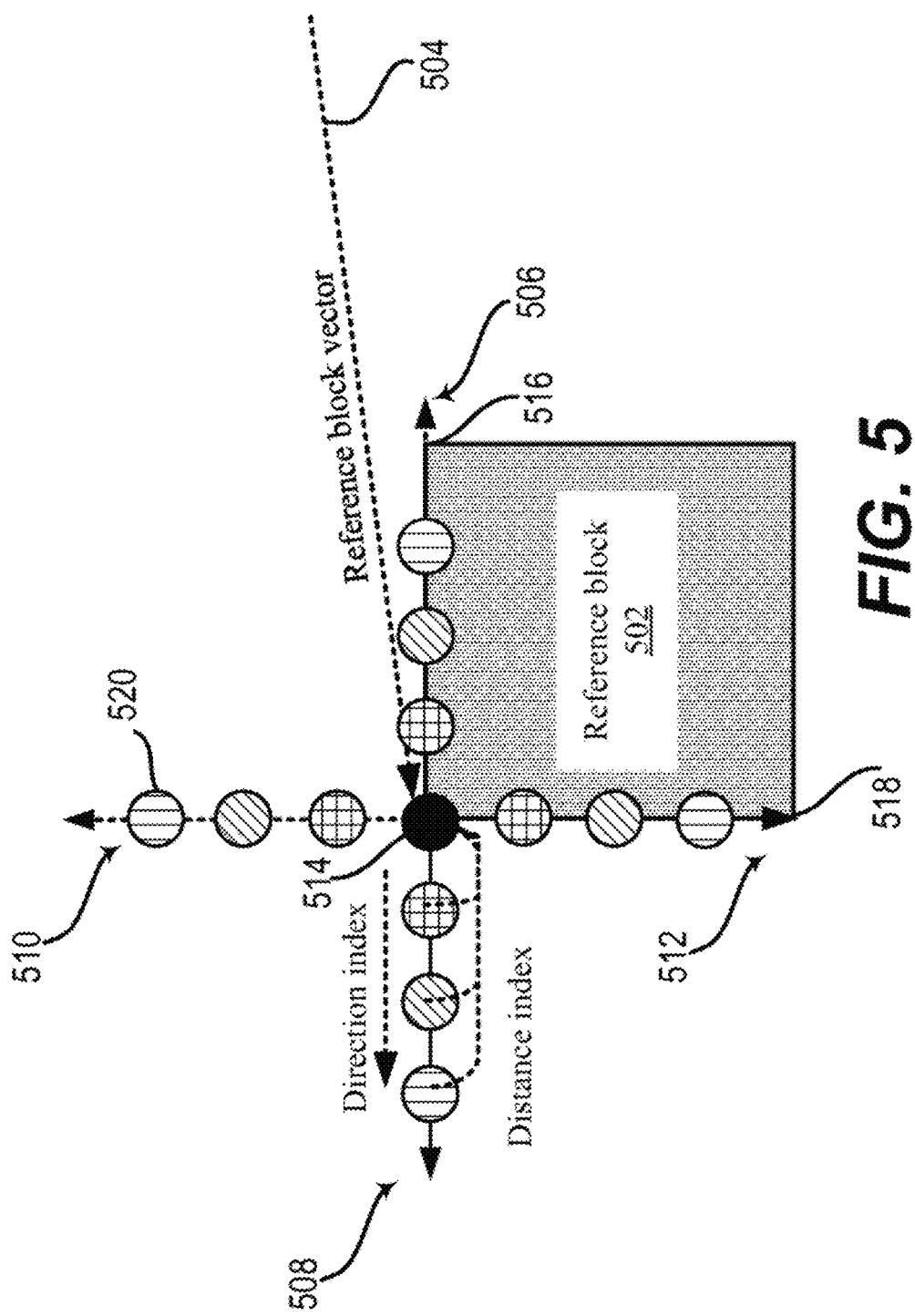
FIG. 5 is a schematic illustration of an example of a block vector refinement according to candidates in one dimensional region according to some aspects of the disclosure.
Figure 6:
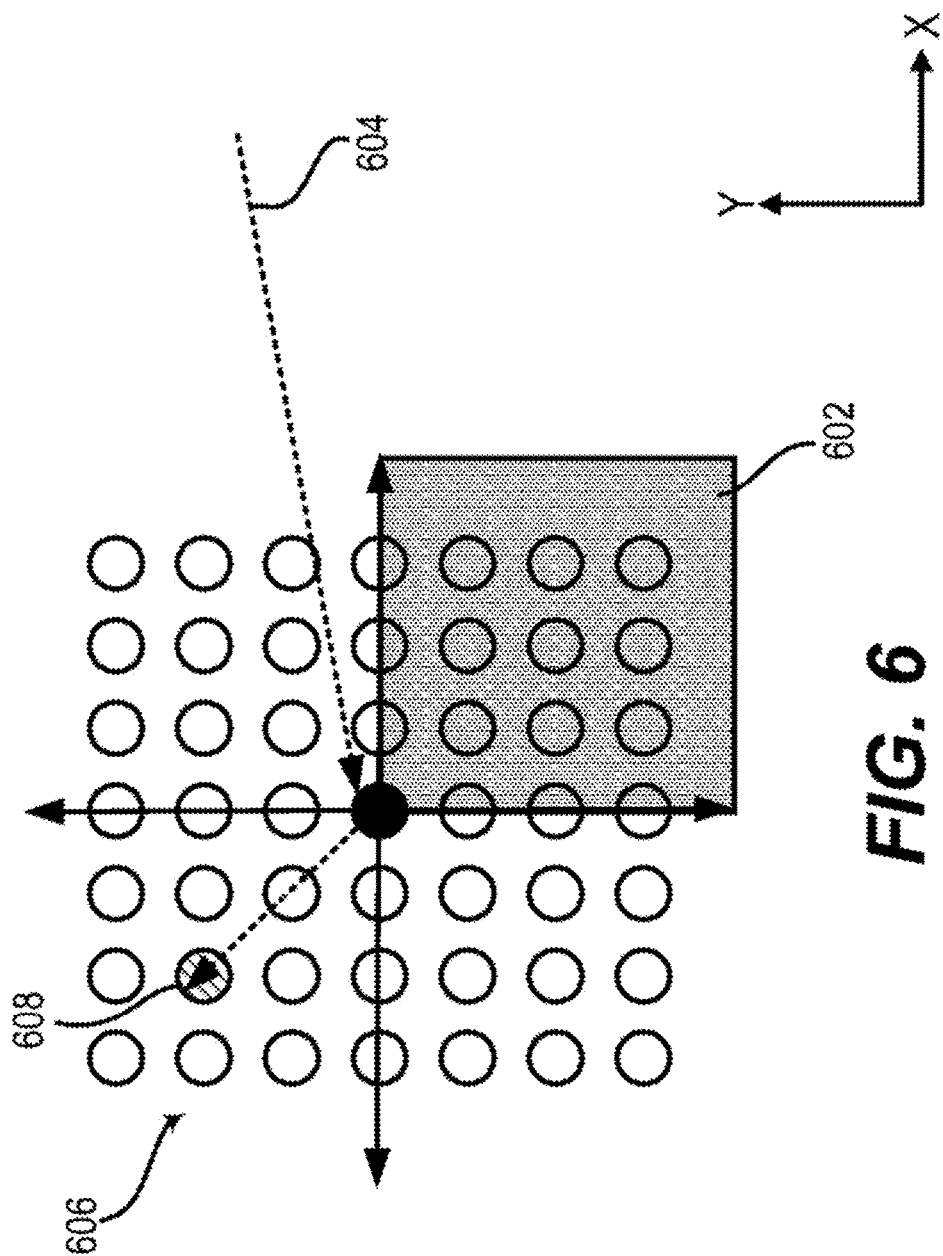
FIG. 6 is a schematic illustration of an example of a block vector refinement with candidates in a two-dimensional region according to some aspects of the disclosure.

As shown in FIG. 5, a reference block vector (504) is derived for a current block (not shown). The reference block vector may be derived based on a neighboring block of the current block, such as the neighboring block TL (412) in FIG. 4. The reference block vector (504) may function as an initial or starting reference block vector for the current block. The reference block vector (504) corresponds to a reference block (502). Thus, the reference block (502) is an initial prediction block for the current block. Further, a plurality of candidate refinement positions is defined.

Referring to FIG. 5, the plurality of candidate refinement positions includes at least one of a first group (506), a second group (508), a third group (510), and a fourth group (512). The first group (506) is arranged along a first direction that starts from an upper left corner (514) of the reference block (502) and extends toward an upper right corner (516) of the reference block (502). In an example, the first group of candidate refinement positions is disposed at a top side of the reference block (502). The second group (508) is arranged along a second direction that starts from the upper left corner (514) of the reference block (502) and the second direction is opposite to the first direction. The third group (510) of the candidate refinement positions is arranged along a third direction that starts from the upper left corner (514) of the reference block (502) and extends away from a left side of the reference block (502). The third direction is perpendicular to the first direction and the second direction. The fourth group (512) is arranged along a fourth direction that starts from the upper left corner (514) of the reference block (502) and extends toward a lower left corner (518). The fourth group (512) is positioned at the left side of the reference block (502), and the fourth direction is opposite to the third direction.

Still referring to FIG. 5, a direction index may be assigned to each group of the candidate refinement positions. Each group of the candidate refinement positions may include more than one candidate refinement position (e.g., (520)). A distance index may be assigned to each candidate refinement position in a respective group. A distance between two candidate refinement positions may be in a sub-pel scale or in a pel scale. Each candidate refinement position may indicate a respective candidate refined reference block vector. Each candidate refined reference block vector may indicate a respective candidate reference block. Cost values may be calculated between each candidate reference block and the current block. A refined reference block vector for the current block is determined from the candidate refined reference block vectors. The refined reference block vector corresponds to a candidate reference block that has a minimum cost value.

In an example, refined information may be represented from a two-dimensional refine region. In an example, the two-dimensional refine region is a pre-defined range which indicates a plurality of candidates (or candidate refinement positions). An example of the refine range (or refine window) (606) is shown in FIG. 6. As shown in FIG. 6, candidates may be constructed in a unit of integer and/or fraction. A starting block vector (or starting reference block vector) (604) may be inherited from neighboring blocks of a current block (not shown), such as the neighboring block TL (412). The starting block vector may indicate a reference block (or initial reference block) (602) for the current block. The refine range (606) may be pre-defined as an N×M window, where N and M is a non-negative number. In an example of FIG. 6, the refine window is 8×8. Thus, 64 candidate refinement positions are included in FIG. 6. Each candidate refinement position (e.g., (608)) indicates a respective candidate reference block vector. Each candidate refined reference block vector may be represented as a coordinate within the refine window (606). The coordinate of a candidate refined reference block vector may include a first value in a first direction (e.g., X direction) and a second value in a second direction (e.g., a Y direction). In an example, an original of the coordinate is defined at an upper left corner of the reference block (602). A candidate refinement position may be represented as an index from a list, and the list may be constructed from the refine window (606) by a pre-defined scan order.

In an aspect, the merge mode described above, such as in FIGS. 5 and 6, is only enabled depending on intra template matching information of neighboring blocks. In an example, the merge mode is enabled when at least one of the neighbouring blocks is coded with the intra template matching mode (or intra template matching prediction). In an example, the merge mode is enabled when a total number of neighbouring blocks coded with intra template matching mode is larger than N (N>0). In an example, the merge mode is enabled when at least two of the neighboring blocks coded with the intra template matching mode shows a similarity. The similarity may be pre-defined. In an example, the similarity indicates that block vectors of the at least two blocks are the same. In an example, the similarity indicates that integer parts of the block vectors of the at least two blocks are the same when at least one of the block vectors of the at least two blocks have a fractional block vector. In an example, the similarity indicates that one of flags of the at least two neighboring blocks are the same. The other flags may include a fusion flag, a filter flag, or a sub-pel flag.

Figure 7:
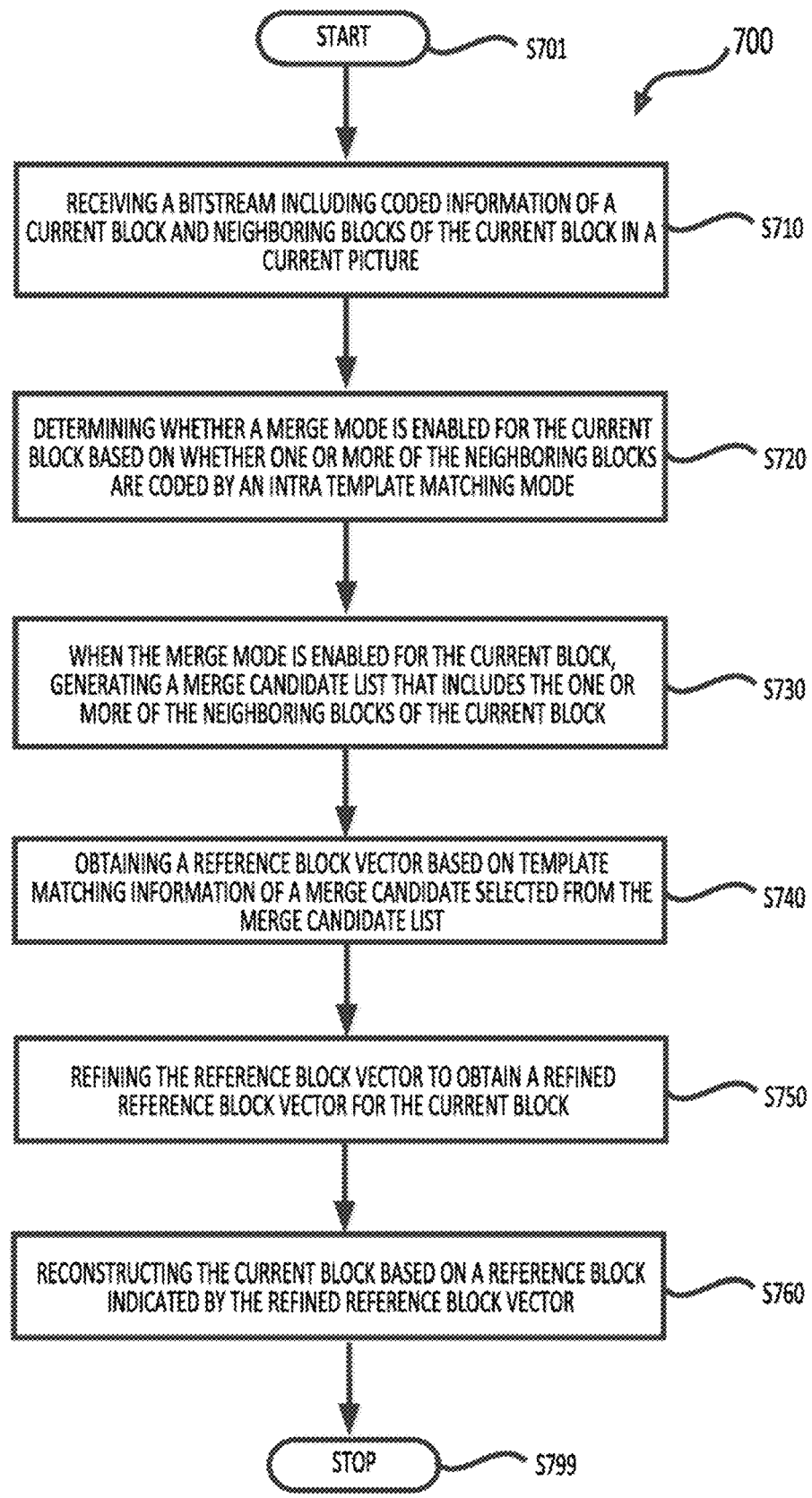
FIG. 7 shows a flow chart outlining a decoding process according to some aspects of the disclosure.

FIG. 7 shows a flow chart outlining a process (700) according to an aspect of the disclosure. The process (700) can be used in a video decoder. In various aspects, the process (700) is executed by processing circuitry, such as the processing circuitry that performs functions of the video decoder (110), the processing circuitry that performs functions of the video decoder (210), and the like. In some aspects, the process (700) is implemented in software instructions, thus when the processing circuitry executes the software instructions, the processing circuitry performs the process (700). The process starts at (S701) and proceeds to (S710).

At (S710), a bitstream including coded information of a current block and neighboring blocks of the current block in a current picture is received.

At (S720), whether a merge mode is enabled for the current block is determined based on whether one or more of the neighboring blocks are coded by an intra template matching mode.

At (S730), when the merge mode is enabled for the current block, a merge candidate list that includes the one or more of the neighboring blocks of the current block is generated.

At (S740), a reference block vector is determined based on template matching information of a merge candidate selected from the merge candidate list.

At (S750), the reference block vector is refined to obtain a refined reference block vector for the current block.

At (S760), the current block is reconstructed based on a reference block indicated by the refined reference block vector.

In an aspect, the merge mode is determined to be enabled for the current block based on one of (i) a first flag in the bitstream indicating whether the merge mode is enabled, (ii) at least one of the neighboring blocks being coded by the intra template matching mode, (iii) a total number of blocks in the neighboring blocks that are coded by the intra template matching mode being larger than a pre-defined value, and (iv) at least two of the neighboring blocks coded by the intra template matching mode including a pre-defined similarity.

In an aspect, the pre-defined similarity indicates one of: block vectors of the at least two of the neighboring blocks that are coded by the intra template matching mode being the same, block vectors of the at least two of the neighboring blocks that are coded by the intra template matching mode having a same integer part when at least one of the at least two of the neighboring blocks has a fractional block vector, and a value of a second flag of each of the at least two of the neighboring blocks being the same, the second flag including one of a fusion flag, a filter flag, and a sub-pel flag.

In an aspect, a plurality of merge candidates is derived for the merge candidate list from the neighboring blocks according to a pre-defined search order, where each of the plurality of merge candidates is coded by the intra template matching mode.

In an aspect, the pre-defined search order is determined based on at least one of a block size, a block shape, or the coded information of the current block.

In an aspect, when none of the neighboring blocks is coded by the intra template matching mode, the merge candidate list is filled with a plurality of pre-defined merge candidates.

In an aspect, the template matching information includes at least one of a template matching prediction method flag, a fusion flag, a block vector index, a filtering flag, a sub-pel flag, or a sub-pel index.

In an aspect, the merge candidate is selected from the merge candidate list according to an index indicated by a syntax element included in the bitstream.

In an aspect, a plurality of candidate refinement positions is determined for the reference block vector. Each of the plurality of candidate refinement positions indicates a respective candidate refined reference block vector. The refined reference block vector is determined from the candidate refined reference block vectors based on an index indicated by a syntax element, where the index indicates which one of the plurality of candidate refinement positions is selected.

In an aspect, the reference block vector indicates an initial reference block of the current block. The plurality of candidate refinement positions includes: a first group of the plurality of candidate refinement positions arranged along a first direction and positioned at a top side of the initial reference block, a second group of the plurality of candidate refinement positions arranged along a second direction, the second direction being opposite to the first direction, a third group of the plurality of candidate refinement positions arranged along a third direction that is perpendicular to the first direction and the second direction and positioned at a left side of the initial reference block, and a fourth group of the plurality of candidate refinement positions arranged along a fourth direction that is opposite to the third direction.

In an aspect, the reference block vector indicates an initial reference block of the current block. The plurality of candidate refinement positions includes a N×M refined window that is centered at an upper left corner of the initial reference block. Each of N and M is a respective non-negative number.

Then, the process proceeds to (S799) and terminates.

The process (700) can be suitably adapted. Step(s) in the process (700) can be modified and/or omitted. Additional step(s) can be added. Any suitable order of implementation can be used.

Figure 8:
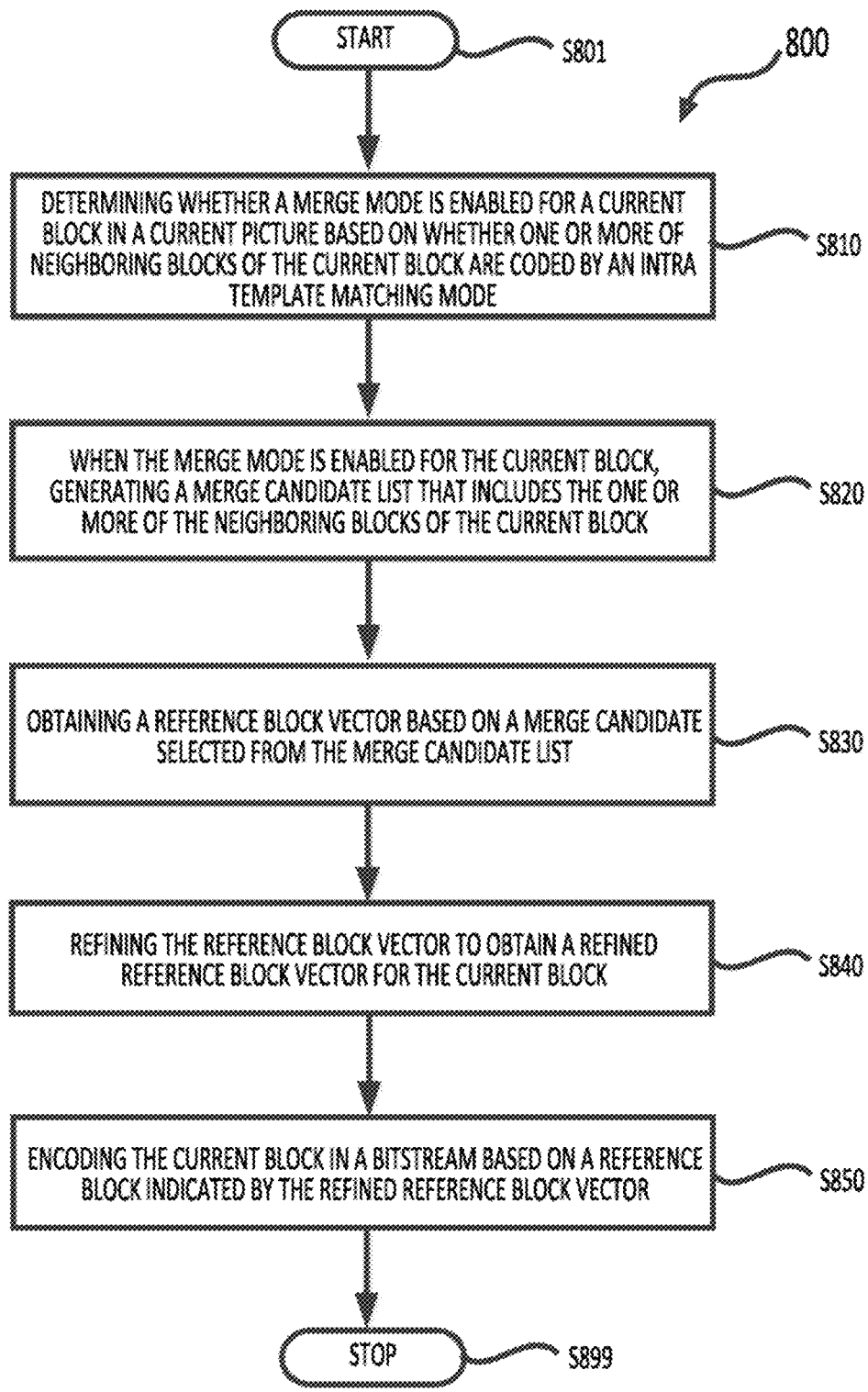
FIG. 8 shows a flow chart outlining an encoding process according to some aspects of the disclosure.

FIG. 8 shows a flow chart outlining a process (800) according to an aspect of the disclosure. The process (800) can be used in a video encoder. In various aspects, the process (800) is executed by processing circuitry, such as the processing circuitry that performs functions of the video encoder (103), the processing circuitry that performs functions of the video encoder (303), and the like. In some aspects, the process (800) is implemented in software instructions, thus when the processing circuitry executes the software instructions, the processing circuitry performs the process (800). The process starts at (S801) and proceeds to (S810).

At (S810), whether a merge mode is enabled for a current block in a current picture is determined based on whether one or more of neighboring blocks of the current block are coded by an intra template matching mode.

At (S820), when the merge mode is enabled for the current block, a merge candidate list is generated to include the one or more of the neighboring blocks of the current block.

At (S830), a reference block vector is obtained based on a merge candidate selected from the merge candidate list.

At (S840), the reference block vector is refined to obtain a refined reference block vector for the current block.

At (S850), the current block is encoded in a bitstream based on a reference block indicated by the refined reference block vector.

In an aspect, the merge mode is determined to be enabled for the current block based on one of (i) the merge mode being enabled, (ii) at least one of the neighboring blocks being coded by the intra template matching mode, (iii) a total number of blocks in the neighboring blocks that are coded by the intra template matching mode being larger than a pre-defined value, and (iv) at least two of the neighboring blocks coded by the intra template matching mode including a pre-defined similarity.

In an aspect, the pre-defined similarity indicates one of: block vectors of the at least two of the neighboring blocks that are coded by the intra template matching mode being the same, block vectors of the at least two of the neighboring blocks that are coded by the intra template matching mode having a same integer part when at least one of the at least two of the neighboring blocks has a fractional block vector, and each of the at least two of the neighboring blocks having one of a same fusion mode, a same filter mode, and a same sub-pel resolution.

In an aspect, a plurality of merge candidates is derived for the merge candidate list from the neighboring blocks according to a pre-defined search order, where each of the plurality of merge candidates is coded by the intra template matching mode.

In an aspect, the pre-defined search order is determined based on at least one of a block size or a block shape of the current block.

In an aspect, when none of the neighboring blocks is coded by the intra template matching mode, the merge candidate list is filled with a plurality of pre-defined merge candidates.

In an aspect, a best-performed merge candidate is selected from the merge candidate list. The reference block vector is determined to correspond to the selected best-performed merge candidate.

In an aspect, a plurality of candidate refinement positions is determined for the reference block vector. Each of the plurality of candidate refinement positions indicates a respective candidate refined reference block vector. A plurality of candidate reference blocks is determined. Each of the plurality of candidate reference blocks is indicated by a respective candidate refined reference block vector. A cost value between each of the plurality of candidate reference blocks and the current block is calculated. The refined reference block vector is determined from the candidate refined reference block vectors that corresponds to a minimum cost value of the cost values between the plurality of candidate reference blocks and the current block.

Then, the process proceeds to (S899) and terminates.

The process (800) can be suitably adapted. Step(s) in the process (800) can be modified and/or omitted. Additional step(s) can be added. Any suitable order of implementation can be used.

In an aspect, a method of processing video data (or visual media data) includes processing a bitstream of the video data according to a format rule. For example, the bitstream may be a bitstream that is decoded/encoded in any of the decoding and/or encoding methods described herein. The format rule may specify one or more constraints of the bitstream and/or one or more processes to be performed by the decoder and/or encoder.

In an example, the bitstream includes coded information of a current block and neighboring blocks of the current block in a current picture. The format rule specifies that whether a merge mode is enabled for the current block is determined based on whether one or more of the neighboring blocks are coded by an intra template matching mode. The format rule specifies that, when the merge mode is enabled for the current block, a merge candidate list that includes the one or more of the neighboring blocks of the current block is generated. The format rule specifies that a reference block vector is obtained based on template matching information of a merge candidate selected from the merge candidate list. The format rule specifies that the reference block vector is refined to obtain a refined reference block vector for the current block. The format rule specifies that the current block is processed based on a reference block indicated by the refined reference block vector.

The techniques described above, can be implemented as computer software using computer-readable instructions and physically stored in one or more computer-readable media. For example, FIG. 9 shows a computer system (900) suitable for implementing certain aspects of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 9:
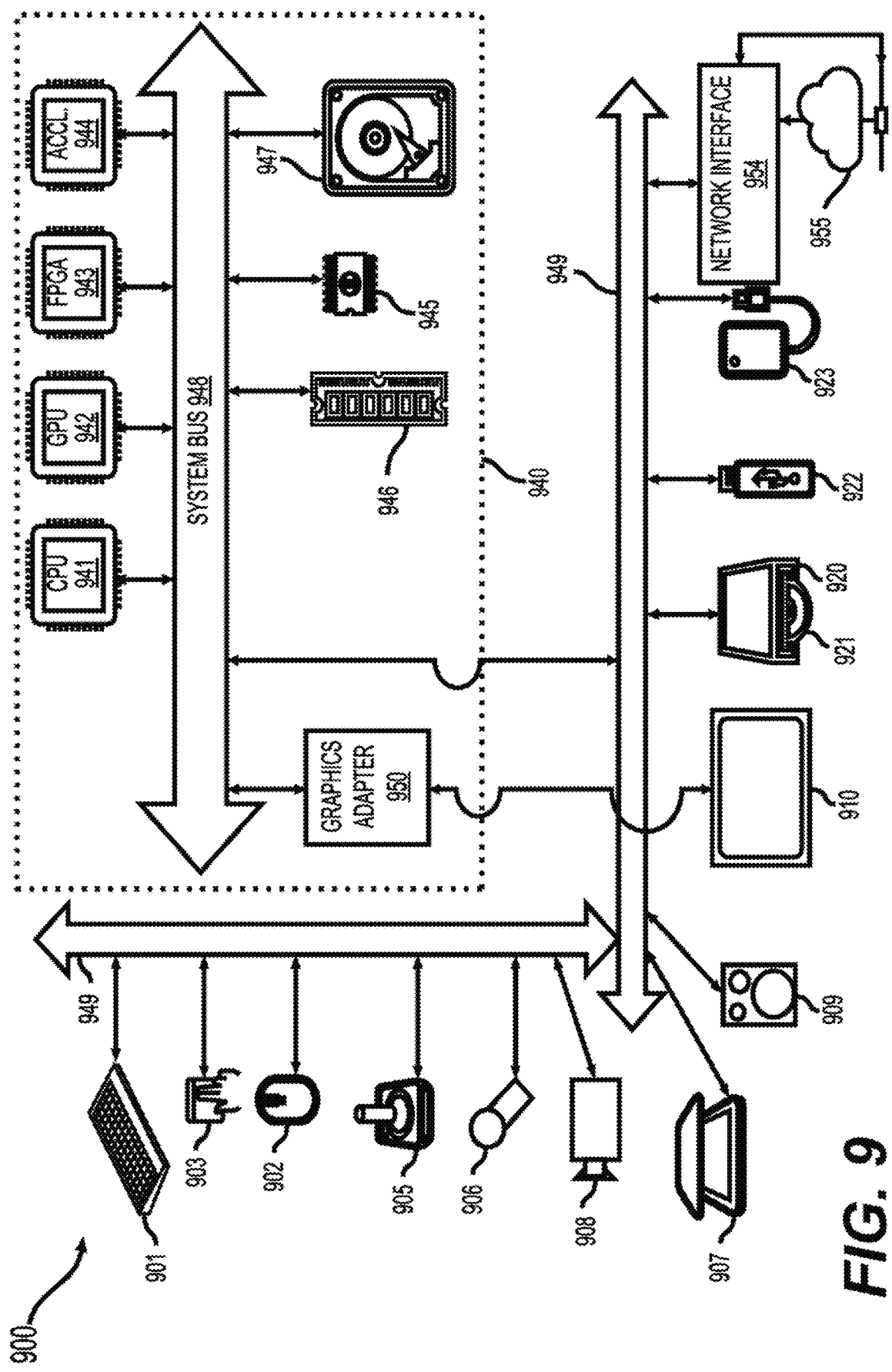
FIG. 9 is a schematic illustration of a computer system in accordance with an aspect.

The components shown in FIG. 9 for computer system (900) are examples and are not intended to suggest any limitation as to the scope of use or functionality of the computer software implementing aspects of the present disclosure. Neither should the configuration of components be interpreted as having any dependency or requirement relating to any one or combination of components illustrated in the example aspect of computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove (not shown), joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove (not shown), or joystick (905), but there can also be tactile feedback devices that do not serve as input devices), audio output devices (such as: speakers (909), headphones (not depicted)), visual output devices (such as screens (910) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include an interface (954) to one or more communication networks (955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (949) (such as, for example USB ports of the computer system (900)); others are commonly integrated into the core of the computer system (900) by attachment to a system bus as described below (for example Ethernet interface into a PC computer system or cellular network interface into a smartphone computer system). Using any of these networks, computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators for certain tasks (944), graphics adapters (950), and so forth. These devices, along with Read-only memory (ROM) (945), Random-access memory (946), internal mass storage such as internal non-user accessible hard drives, SSDs, and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). In an example, the screen (910) can be connected to the graphics adapter (950). Architectures for a peripheral bus include PCI, USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various aspects of the present disclosure can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several examples of aspects, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

(1) A method of video decoding, including: receiving a bitstream including coded information of a current block and neighboring blocks of the current block in a current picture; determining whether a merge mode is enabled for the current block based on whether one or more of the neighboring blocks are coded by an intra template matching mode; when the merge mode is enabled for the current block, generating a merge candidate list that includes the one or more of the neighboring blocks of the current block; obtaining a reference block vector based on template matching information of a merge candidate selected from the merge candidate list; refining the reference block vector to obtain a refined reference block vector for the current block; and reconstructing the current block based on a reference block indicated by the refined reference block vector.

(2) The method of feature (1), in which the determining further includes: determining that the merge mode is enabled for the current block based on one of (i) a first flag in the bitstream indicating whether the merge mode is enabled, (ii) at least one of the neighboring blocks being coded by the intra template matching mode, (iii) a total number of blocks in the neighboring blocks that are coded by the intra template matching mode being larger than a pre-defined value, and (iv) at least two of the neighboring blocks coded by the intra template matching mode including a pre-defined similarity.

(3) The method of feature (2), in which the pre-defined similarity indicates one of:

block vectors of the at least two of the neighboring blocks that are coded by the intra template matching mode being the same, block vectors of the at least two of the neighboring blocks that are coded by the intra template matching mode having a same integer part when at least one of the at least two of the neighboring blocks has a fractional block vector, and a value of a second flag of each of the at least two of the neighboring blocks being the same, the second flag including one of a fusion flag, a filter flag, and a sub-pel flag.

(4) The method of any of features (1) to (3), in which the generating further includes: deriving a plurality of merge candidates for the merge candidate list from the neighboring blocks according to a pre-defined search order, each of the plurality of merge candidates being coded by the intra template matching mode.

(5) The method of feature (4), in which the pre-defined search order is determined based on at least one of a block size, a block shape, or the coded information of the current block.

(6) The method of any of features (1) to (5), in which the generating further includes: when none of the neighboring blocks is coded by the intra template matching mode, filling the merge candidate list with a plurality of pre-defined merge candidates.

(7) The method of any of features (1) to (6), in which the template matching information includes at least one of a template matching prediction method flag, a fusion flag, a block vector index, a filtering flag, a sub-pel flag, or a sub-pel index.

(8) The method of any of features (1) to (7), in which the merge candidate is selected from the merge candidate list according to an index indicated by a syntax element included in the bitstream.

(9) The method of any of features (1) to (8), in which the refining the reference block vector further includes: determining a plurality of candidate refinement positions for the reference block vector, each of the plurality of candidate refinement positions indicating a respective candidate refined reference block vector; and determining the refined reference block vector from the candidate refined reference block vectors based on an index indicated by a syntax element, the index indicating which one of the plurality of candidate refinement positions is selected.

(10) The method of feature (9), in which: the reference block vector indicates an initial reference block of the current block; and the plurality of candidate refinement positions includes: a first group of the plurality of candidate refinement positions arranged along a first direction and positioned at a top side of the initial reference block, a second group of the plurality of candidate refinement positions arranged along a second direction, the second direction being opposite to the first direction, a third group of the plurality of candidate refinement positions arranged along a third direction that is perpendicular to the first direction and the second direction and positioned at a left side of the initial reference block, and a fourth group of the plurality of candidate refinement positions arranged along a fourth direction that is opposite to the third direction.

(11) The method of feature (9), in which: the reference block vector indicates an initial reference block of the current block; and the plurality of candidate refinement positions includes a N×M refined window that is centered at an upper left corner of the initial reference block, each of N and M being a respective non-negative number.

(12) A method of video encoding, including: determining whether a merge mode is enabled for a current block in a current picture based on whether one or more of neighboring blocks of the current block are coded by an intra template matching mode; when the merge mode is enabled for the current block, generating a merge candidate list that includes the one or more of the neighboring blocks of the current block; obtaining a reference block vector based on a merge candidate selected from the merge candidate list; refining the reference block vector to obtain a refined reference block vector for the current block; and encoding the current block in a bitstream based on a reference block indicated by the refined reference block vector.

(13) The method of feature (12), in which the determining further includes: determining that the merge mode is enabled for the current block based on one of (i) the merge mode being enabled, (ii) at least one of the neighboring blocks being coded by the intra template matching mode, (iii) a total number of blocks in the neighboring blocks that are coded by the intra template matching mode being larger than a pre-defined value, and (iv) at least two of the neighboring blocks coded by the intra template matching mode including a pre-defined similarity.

(14) The method of feature (13), in which the pre-defined similarity indicates one of: block vectors of the at least two of the neighboring blocks that are coded by the intra template matching mode being the same, block vectors of the at least two of the neighboring blocks that are coded by the intra template matching mode having a same integer part when at least one of the at least two of the neighboring blocks has a fractional block vector, and each of the at least two of the neighboring blocks having one of a same fusion mode, a same filter mode, and a same sub-pel resolution.

(15) The method of any of features (12) to (14), in which the generating further includes: deriving a plurality of merge candidates for the merge candidate list from the neighboring blocks according to a pre-defined search order, each of the plurality of merge candidates being coded by the intra template matching mode.

(16) The method of feature (15), in which the pre-defined search order is determined based on at least one of a block size or a block shape of the current block.

(17) The method of any of features (12) to (16), in which the generating further includes: when none of the neighboring blocks is coded by the intra template matching mode, filling the merge candidate list with a plurality of pre-defined merge candidates.

(18) The method of any of features (12) to (17), in which the obtaining further includes: selecting a best-performed merge candidate from the merge candidate list; and determining the reference block vector that corresponds to the selected best-performed merge candidate.

(19) The method of any of features (12) to (18), in which the refining the reference block vector further includes: determining a plurality of candidate refinement positions for the reference block vector, each of the plurality of candidate refinement positions indicating a respective candidate refined reference block vector; determining a plurality of candidate reference blocks, each of the plurality of candidate reference blocks being indicated by a respective candidate refined reference block vector; calculating a cost value between each of the plurality of candidate reference blocks and the current block; and determining the refined reference block vector from the candidate refined reference block vectors that corresponds to a minimum cost value of the cost values between the plurality of candidate reference blocks and the current block.

(20) A method of processing visual media data, the method including: processing a bitstream of the visual media data according to a format rule, in which: the bitstream includes coded information of a current block and neighboring blocks of the current block in a current picture; and the format rule specifies that: whether a merge mode is enabled for the current block is determined based on whether one or more of the neighboring blocks are coded by an intra template matching mode; when the merge mode is enabled for the current block, a merge candidate list that includes the one or more of the neighboring blocks of the current block is generated; a reference block vector is obtained based on template matching information of a merge candidate selected from the merge candidate list; the reference block vector is refined to obtain a refined reference block vector for the current block; and the current block is processed based on a reference block indicated by the refined reference block vector.

(21) An apparatus for video decoding, including processing circuitry that is configured to perform the method of any of features (1) to (11).

(22) An apparatus for video encoding, including processing circuitry that is configured to perform the method of any of features (12) to (19).

(23) A non-transitory computer-readable storage medium storing instructions which when executed by at least one processor cause the at least one processor to perform the method of any of features (1) to (19).

What is claimed is:

1. A method of video decoding, comprising:
receiving a bitstream including coded information of a current block and neighboring blocks of the current block in a current picture;
determining whether a merge mode is enabled for the current block based on whether one or more of the neighboring blocks are coded by an intra template matching mode;
when the merge mode is enabled for the current block, generating a merge candidate list that includes the one or more of the neighboring blocks of the current block;
obtaining a reference block vector based on template matching information of a merge candidate selected from the merge candidate list;
refining the reference block vector to obtain a refined reference block vector for the current block; and
reconstructing the current block based on a reference block indicated by the refined reference block vector.

2. The method of claim 1, wherein the determining further comprises:
Determining that the merge mode is enabled for the current block based on one of (i) a first flag in the bitstream indicating whether the merge mode is enabled, (ii) at least one of the neighboring blocks being coded by the intra template matching mode, (iii) a total number of blocks in the neighboring blocks that are coded by the intra template matching mode being larger than a pre-defined value, and (iv) at least two of the neighboring blocks coded by the intra template matching mode including a pre-defined similarity.

3. The method of claim 2, wherein the pre-defined similarity indicates one of:
block vectors of the at least two of the neighboring blocks that are coded by the intra template matching mode being the same,
block vectors of the at least two of the neighboring blocks that are coded by the intra template matching mode having a same integer part when at least one of the at least two of the neighboring blocks has a fractional block vector, and
a value of a second flag of each of the at least two of the neighboring blocks being the same, the second flag including one of a fusion flag, a filter flag, and a sub-pel flag.

4. The method of claim 1, wherein the generating further comprises:
deriving a plurality of merge candidates for the merge candidate list from the neighboring blocks according to a pre-defined search order, each of the plurality of merge candidates being coded by the intra template matching mode.

5. The method of claim 4, wherein the pre-defined search order is determined based on at least one of a block size, a block shape, or the coded information of the current block.

6. The method of claim 1, wherein the generating further comprises:
when none of the neighboring blocks is coded by the intra template matching mode, filling the merge candidate list with a plurality of pre-defined merge candidates.

7. The method of claim 1, wherein the template matching information includes at least one of a template matching prediction method flag, a fusion flag, a block vector index, a filtering flag, a sub-pel flag, or a sub-pel index.

8. The method of claim 1, wherein the merge candidate is selected from the merge candidate list according to an index indicated by a syntax element included in the bitstream.

9. The method of claim 1, wherein the refining the reference block vector further comprises:
determining a plurality of candidate refinement positions for the reference block vector, each of the plurality of candidate refinement positions indicating a respective candidate refined reference block vector; and
determining the refined reference block vector from the candidate refined reference block vectors based on an index indicated by a syntax element, the index indicating which one of the plurality of candidate refinement positions is selected.

10. The method of claim 9, wherein:
the reference block vector indicates an initial reference block of the current block; and
the plurality of candidate refinement positions comprises:
a first group of the plurality of candidate refinement positions arranged along a first direction and positioned at a top side of the initial reference block,
a second group of the plurality of candidate refinement positions arranged along a second direction, the second direction being opposite to the first direction, a third group of the plurality of candidate refinement positions arranged along a third direction that is perpendicular to the first direction and the second direction and positioned at a left side of the initial reference block, and a fourth group of the plurality of candidate refinement positions arranged along a fourth direction that is opposite to the third direction.

11. The method of claim 9, wherein:

the reference block vector indicates an initial reference block of the current block; and the plurality of candidate refinement positions includes a N×M refined window that is centered at an upper left corner of the initial reference block, each of N and M being a respective non-negative number.

12. A method of video encoding, comprising:

determining whether a merge mode is enabled for a current block in a current picture based on whether one or more of neighboring blocks of the current block are coded by an intra template matching mode;

when the merge mode is enabled for the current block, generating a merge candidate list that includes the one or more of the neighboring blocks of the current block;

obtaining a reference block vector based on a merge candidate selected from the merge candidate list;

refining the reference block vector to obtain a refined reference block vector for the current block; and encoding the current block in a bitstream based on a reference block indicated by the refined reference block vector.

13. The method of claim 12, wherein the determining further comprises:

determining that the merge mode is enabled for the current block based on one of (i) the merge mode being enabled, (ii) at least one of the neighboring blocks being coded by the intra template matching mode, (iii) a total number of blocks in the neighboring blocks that are coded by the intra template matching mode being larger than a pre-defined value, and (iv) at least two of the neighboring blocks coded by the intra template matching mode including a pre-defined similarity.

14. The method of claim 13, wherein the pre-defined similarity indicates one of:

block vectors of the at least two of the neighboring blocks that are coded by the intra template matching mode being the same, block vectors of the at least two of the neighboring blocks that are coded by the intra template matching mode having a same integer part when at least one of the at least two of the neighboring blocks has a fractional block vector, and each of the at least two of the neighboring blocks having one of a same fusion mode, a same filter mode, and a same sub-pel resolution.

15. The method of claim 12, wherein the generating further comprises:

deriving a plurality of merge candidates for the merge candidate list from the neighboring blocks according to a pre-defined search order, each of the plurality of merge candidates being coded by the intra template matching mode.

16. The method of claim 15, wherein the pre-defined search order is determined based on at least one of a block size or a block shape of the current block.

17. The method of claim 12, wherein the generating further comprises:

when none of the neighboring blocks is coded by the intra template matching mode, filling the merge candidate list with a plurality of pre-defined merge candidates.

18. The method of claim 12, wherein the obtaining further comprises:

selecting a best-performed merge candidate from the merge candidate list; and determining the reference block vector that corresponds to the selected best-performed merge candidate.

19. The method of claim 12, wherein the refining the reference block vector further comprises:

determining a plurality of candidate refinement positions for the reference block vector, each of the plurality of candidate refinement positions indicating a respective candidate refined reference block vector;

determining a plurality of candidate reference blocks, each of the plurality of candidate reference blocks being indicated by a respective candidate refined reference block vector;

calculating a cost value between each of the plurality of candidate reference blocks and the current block; and determining the refined reference block vector from the candidate refined reference block vectors that corresponds to a minimum cost value of the cost values between the plurality of candidate reference blocks and the current block.

20. A method of processing visual media data, the method comprising:

processing a bitstream of the visual media data according to a format rule, wherein:

the bitstream includes coded information of a current block and neighboring blocks of the current block in a current picture; and the format rule specifies that:

whether a merge mode is enabled for the current block is determined based on whether one or more of the neighboring blocks are coded by an intra template matching mode;

when the merge mode is enabled for the current block, a merge candidate list that includes the one or more of the neighboring blocks of the current block is generated;

a reference block vector is obtained based on template matching information of a merge candidate selected from the merge candidate list;

the reference block vector is refined to obtain a refined reference block vector for the current block; and the current block is processed based on a reference block indicated by the refined reference block vector.

* * * * *